Oct. 23, 1934.                C. DENNIS                1,978,295
                                RAKE
                       Filed April 6, 1931         4 Sheets-Sheet 1

INVENTOR.
Charles Dennis
BY Slough & Canfield
ATTORNEYS

Oct. 23, 1934.  C. DENNIS  1,978,295
RAKE
Filed April 6, 1931   4 Sheets-Sheet 2
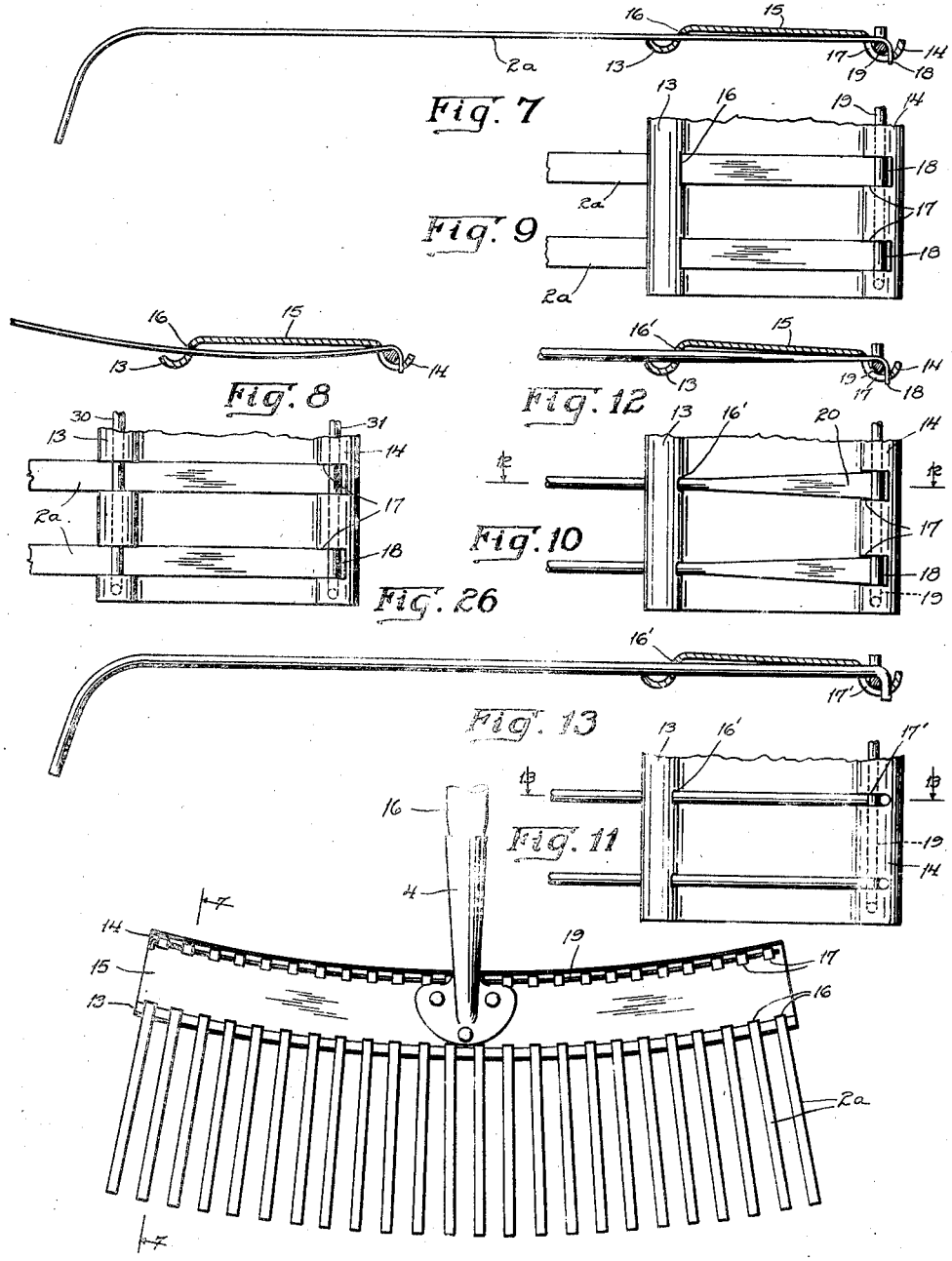
INVENTOR.
Charles Dennis
BY
ATTORNEYS

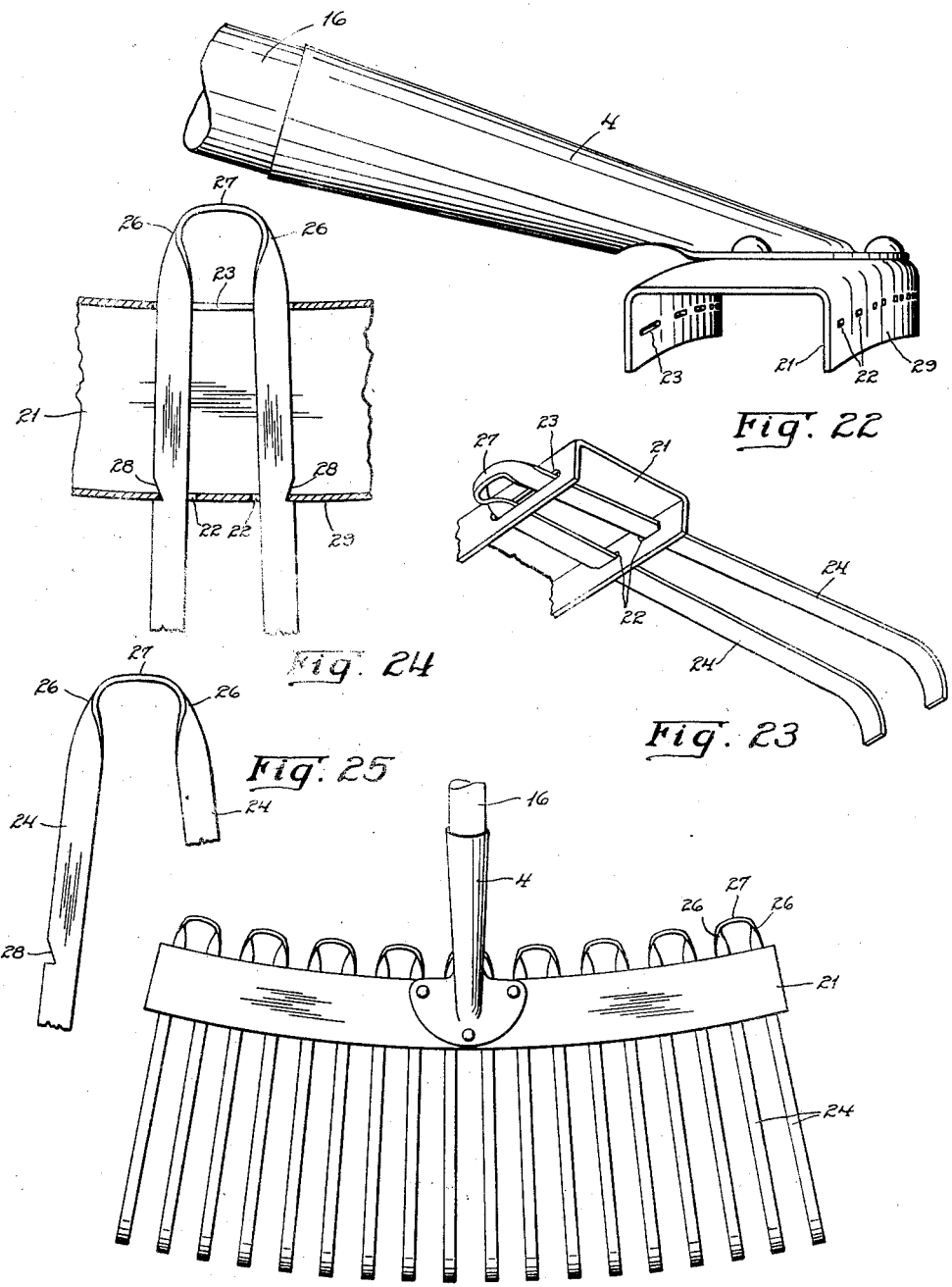

Patented Oct. 23, 1934

1,978,295

UNITED STATES PATENT OFFICE 1,978,295

RAKE

Charles Dennis, Jackson, Mich., assignor to The American Fork & Hoe Company, Cleveland, Ohio, a corporation of Ohio Application April 6, 1931, Serial No. 527,864

15 Claims. (Cl. 55—114)

My invention relates to rakes and relates more particularly to rakes of the so-called "broom rake" type.

An object of my invention is to provide an improved rake wherein the tines are individually separable from the head of the rake.

Another object of my invention is to provide an improved rake, which, while it permits a fairly easy individual removal and replacement of the tines, will however, hold the same securely locked against accidental removal.

Another object of my invention is to provide an improved rake which will be extremely light and durable, inexpensive to manufacture, and economical and efficient in use.

Another object of my invention is to provide an improved rake of the broom type employing flat spring tines.

Another object of my invention is to provide an improved rake of the broom type employing flat spring tines, which are end-wise insertable and removable from the rake head.

Another object of my invention is to provide an improved rake employing flat spring tines wherein the cost of manufacture is low.

Another object of my invention is to provide an improved rake of the type described wherein sweeping of leaves or other trash may be effectively accomplished by an operator standing erect and using the rake in the manner of a broom.

Another object is to provide a rake wherein the different tines thereof are so arranged and extended from the head that approximately all of the tines will readily engage at the same moment with the surface of the ground even though the rake handle is elevated toward the perpendicular position which it assumes when the rake is being used as a broom in sweeping leaves or other trash.

Other objects of my invention, and the invention itself, will become more apparent by reference to the following description of certain embodiments of my invention, and in which description reference will be had to the accompanying drawings forming a part of said embodiment.

In the drawings:

Fig. 6 is a plan view similar to that of Fig. 1 of another form of rake embodying the principles of my invention;

Fig. 7 is an enlarged sectional view taken on the line 7—7 of Fig. 6 showing a tine, shown in elevation, disposed in normal position relative to a head shown in section;

Fig. 8 is a view otherwise like that of Fig. 7, but wherein the tine, a fragment only of which is shown, is shown deflected as are the tines in use when the tip ends thereof are pressed against the ground;

Fig. 9 is a bottom plan view of an end fragment of the rake head of Figs. 6, 7 and 8, with secured fragments of two tines in place thereon together with a fragment of the wire key provided for the rake head shown in position as in Figs. 6 to 8 inclusive;

Fig. 10 is a view like that of Fig. 9, except that modified forms of tines are disclosed in Fig. 10 in conjunction with a rake head of the type shown in Figs. 6 to 9 inclusive;

Fig. 11 is a view otherwise like that of Figs. 9 and 10, except that a third alternative form of rake tine is employed in association with a head of the general type of Figs. 6 to 10 inclusive;

Fig. 12 is a section taken on the line 12—12 of Fig. 10;

Fig. 13 is a section taken on the line 13—13 of Fig. 11, except that the rake tine in Fig. 13 is shown as of full length instead of a mere fragment;

Fig. 21 is a plan view of a rake, which is another embodiment of my invention, the rake handle being illustrated as broken away for compactness of illustration;

Fig. 22 is a side elevational view of the rake head of the rake of Fig. 21, the wood handle being shown as broken away;

Figs. 23 and 24 are respectively isometric and bottom plan views of fragments of the rake head of the foregoing embodiment and an associated tine element secured therein, said element comprising an integrally joined pair of tine prongs;

Fig. 25 is a plan view of a tine element comprising two integrally joined tines of the foregoing embodiment shown apart from the rake head;

Fig. 26 is a bottom plan and Fig. 27 is a longitudinal sectional view of a fragment of another embodiment of my invention.

Figure 2:
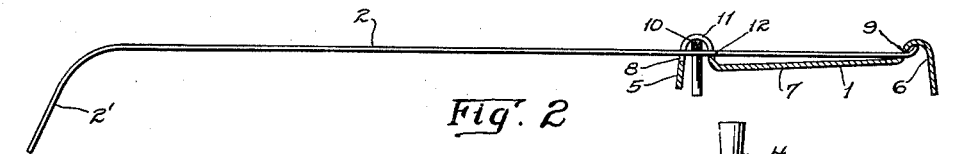
Fig. 2 is a section taken on the line 2—2 of Fig. 1, but enlarged to full size.
Figures 19, 20:
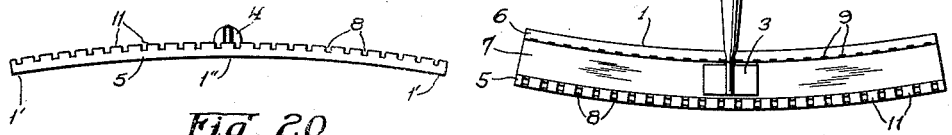
Fig. 19 and Fig. 20 are views respectively in plan and front elevation of the rake head of the rake of Figs. 1 to 5 inclusive, per se, with its rigidly secured handle socket.
Figure 5:
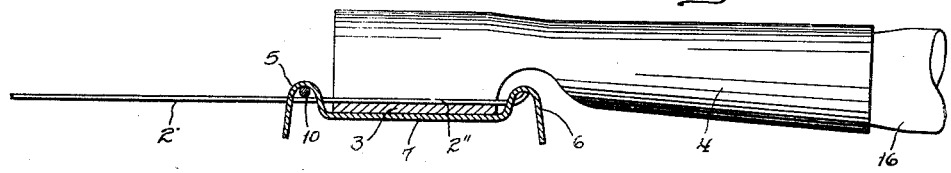
Fig. 5 is a section taken on the line 5—5 of Fig. 1, but enlarged to full size.
Figure 3:
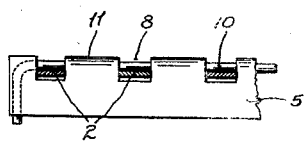
Fig. 3 is a section taken on the line 3—3 of Fig. 1, but enlarged to full size.
Figure 4:
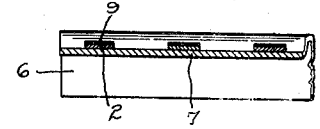
Fig. 4 is a section taken on the line 4—4 of Fig. 1, but enlarged to full size.
Figure 1:
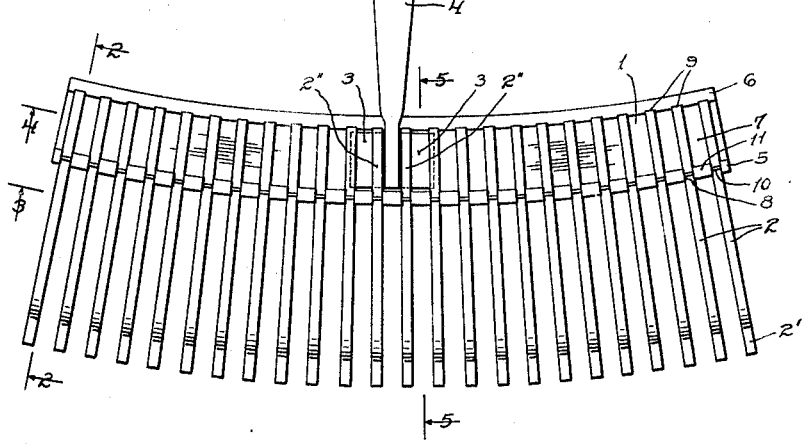
Fig. 1 is a plan view of a rake embodying the principles of my invention, the handle illustrated as having the handle broken away.
Figure 17:
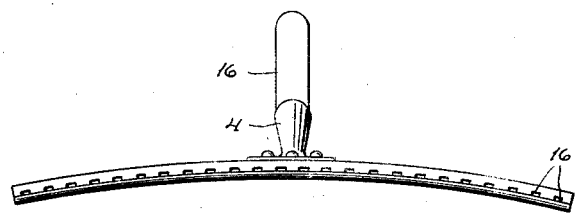
Fig. 17 is a front elevational view of the rake head of Fig. 15 shown as disposed in a horizontal position parallel to the line of sight.
Figure 16:
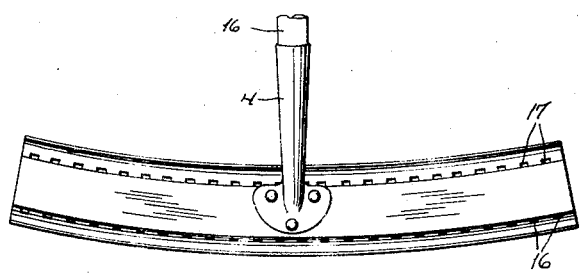
Fig. 16 is a top plan view of the rake head of Figs. 6 and 14 with a fragment of the handle therefor.

The rake of my present invention is illustrated in the drawings in a number of different embodiments. In the first embodiment illustrated in Figs. 1 to 5 inclusive, the handle 16 projected within a tapered tubular metal socket 4 carries a transversely curved channeled cross head 1 which in turn supports the rear ends of a plurality of laterally spaced thin flat elongated resilient metal tines 2, which project forwardly therefrom and are provided with free down-turned ends 2'. The handle socket element 4 is angularly secured to the cross head in any suitable manner such as by laterally extending flanges 3 thereof riveted or welded thereto or clamped between contiguous tine portions such as 2'' and the intermediate body portion 7 of the cross head. The cross head is formed by providing a horizontally arcuate strip of sheet metal which is preferably vertically arched, see Fig. 20, with front and rear flanges, 5 and 6 respectively, which are both of inverted U-form, in transverse sections, the outer pendent portions extending preferably below the level of the adjacent intermediate portion 7.

The tines are secured in place by being projected rearwardly through longitudinally aligned slots or notches 8 of the foremost flange 5 and apertures 9 through the foremost wall of the rearmost flange, both notches and apertures being of widths but very slightly in excess of the widths of the tines, and the tines each having an upturned short bend at their rear ends to interlock with the interior surfaces of the rearmost flange to prevent longitudinal removal of the tine in the head. Each tine is inserted first through one of the apertures 9, while considerably elevated above the slot 8, then rotated downwardly to position where the tines may all be securely locked in place by a wire rod key 10 preferably arcuately pre-formed, projected from one side through to the other side of the rake head between the U-shaped loops 11, intermediate the notches 8, and the upper surfaces of all of the tines 2 which engage at 12 with a rearmost edge of the slot 8.

In the embodiments illustrated in Figs. 6 to 18 inclusive, the cross head, also preferably horizontally arcuate and vertically arched, is provided with front and rear flanges in the form of upright troughs 13 and 14 which are pendent from the intermediate longitudinally straight intermediate body portion 15, the rear wall of the front flange being pierced at intervals at 16, and the rear flange being provided in its more foremost portions with a series of slots or notches 17. The tines 2a are inserted from front to rear through the flanges, first over the foremost portion of the flange 13, then through the aperture 16 and then into the notch 17 to effect abutting engagement by the rear down-turned tine end 18 with the rearmost edge of the slot 17. A wire key 19 preferably of normal arcuate form is projected within the trough formed by the rearmost flange intermediate the inner surface thereof and the under surfaces of the rear ends of the tines. The tines are thereby slightly flexed and reacting hold the key 19 in place.

In the second and third embodiments of my invention illustrated in Figs. 10—12 and 11—13 respectively, the construction is preferably like that of the said second embodiment described, except that the apertures 16' corresponding to the apertures 16 are made circular instead of elongated, in each case to suit the shape of the tines, and in the case of the third embodiment, the rearmost slots 17' are made much narrower since the tines have no rearwardly disposed broad flat portions such as in the case of the tines 2a of the second embodiment and the tine portions 20 of the third embodiment.

Figure 18:
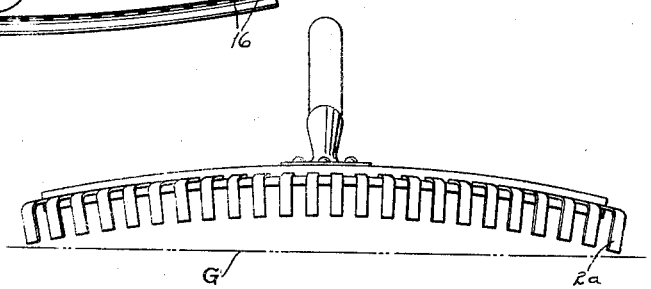
Fig. 18 is a view like that of Fig. 17, except that the rake tines are shown in position on said rake head.
Figure 15:
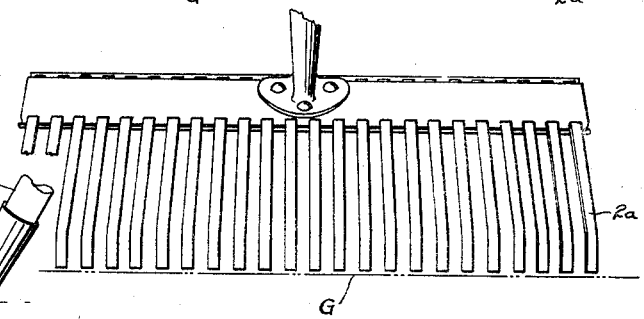
Fig. 14 is an approximately perspective view and Fig. 15 is a front elevational view of a rake of the type shown in Fig. 6 with the handle thereof elevated to a position approaching a vertical position such as it would assume when the rake is in use.
Figure 14:
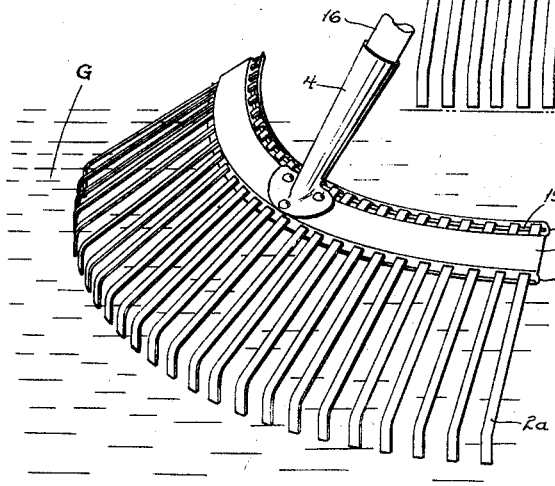

Figs. 14 to 18 inclusive illustrate both the vertically arched nature of the cross heads of the foregoing embodiments of my invention and also the advantages resulting therefrom. Fig. 18 shows the ground line G contacting only the more laterally disposed tines 2a when the rake is disposed in an approximately horizontal position whereas Figs. 14 and 15 illustrate the fact that, by arching the horizontally arcuately formed cross head, the tines 2a which are all substantially the same length and therefore interchangeable, will contact by their down-turned tip portions with the ground by all tines simultaneously. For this reason it is possible to make the rake cross head more rigid than in certain prior constructions wherein simultaneous contact with the ground by all tines was sought to be attained and at the same time the rake will more efficiently sweep the ground when the handle is held nearly vertically as when the operator operates the rake with a sweeping motion.

In the embodiment of my invention illustrated in Figs. 21 to 25 inclusive, the cross head 21 is in the form of an inverted channel, the front wall 29 being provided with a series of spaced elongated tine-receiving apertures 22 and the rearmost wall being provided with a series of more elongated apertures 23 the lengths of which approximate and even exceed the distance between the remote end edges of a pair of the apertures 22. The tines 24 are provided in pairs made from a single piece of thin strips of resilient steel or the like which are twice twisted as shown at 26 to cause the intermediate portion 27 of the integral junction between a pair of associated tines 24 to extend angularly to the plane of the forwardly extending tine portions, both of which are projected through the same aperture 23, each being projected through a separate one of the apertures 22. The tines are preferably notched at their outer edges as shown at 28.

Each of the tine elements comprising joined companion tines 24 have their joining portions so formed that before placement in the head, the two tines will normally extend divergingly as illustrated in Fig. 25.

When the tines are positioned in the cross head the notches 28 being interlocked with the front wall 29 of the channeled head will prevent longitudinal displacement of the tines relative to the head.

As illustrated at best in Fig. 22, the channeled head is vertically arched as in the foregoing embodiments and as shown in Fig. 21, the head is made horizontally arcuate, to achieve the same results in efficiency and simultaneous contact with all tines of the ground as in the foregoing embodiments previously described.

In the embodiment illustrated in Figs. 26 and 27, both the front and rear cross head flanges are notched, and the tines are merely laid within the flanges, and the two like wire rods 30 and 31 are projected within the troughs formed by the flanges between the inner surfaces thereof and the tines, and being tightly wedged in place, are frictionally retained, while they retain the tines in position on the rake head in a manner which will be well understood by reference to a description of the foregoing other embodiments.

In each of the embodiments of my invention described herein, each of the tines is supported on the cross head by two longitudinally spaced portions of the cross head so engaging the tine that when the rake is put into use and the operator sweeping leaves or trash exerts downwardly directed pressure on the handle which is transmitted by the rake head to the tines, pressure engagement of the tip ends of the tines with the ground will cause the tines to resiliently flex. When this occurs, due to the fact that the engagement by the foremost tine-supporting flange with the tine is a fulcruming engagement, the tine may rock slightly on the foremost flange to effect a limited amount of resilient yielding by the tine portion disposed just rearwardly of the foremost support.

In the said first embodiment described, it is noted that the body portion of the cross head, intermediate the flanges, is so spaced from the portions of the tines located intermediate the flanges as to permit yielding of this portion of the tines toward the said body portion. In the other embodiments, flexure of such portion of the tines rearwardly of the foremost cross head flange is purposely effected in a direction away from the said body portion so that such flexing movement may be unrestrained thereby. In such constructions the tines are much less susceptible to breakage than in constructions wherein the tines are rigidly clamped within the foremost support, causing the tine to be subject to severe localized bending of the tine beyond the elastic limit, contiguous to the foremost support.

Having thus described my invention in certain embodiments, I am aware that numerous and extensive departures may be made from the embodiments herein illustrated and described but without departing from the principles of my invention.

Reference may also be had to my co-pending application Serial No. 644,969, filed November 30, 1932, for improvements in rakes.

I claim:

1. A rake cross head for broom rakes of transversely arched form.

2. A rake cross head for broom rakes of horizontally arcuate and vertically arched form.

3. A rake cross head for broom rakes concave rearwardly and downwardly from its intermediate portion.

4. A rake comprising a plurality of tines, the free end of each tine carrying a downwardly extending finger, all of the fingers being of equal length, the tines being disposed in a manner to give the outer end of the rake a semi-circular shape and means for holding the outer ends of the tines in an arched position with the outer ends of the middle tines higher than the outer ends of the tines at the sides of the rake.

5. A rake comprising a plurality of tines, the free end of each tine carrying a downwardly extending finger, all of the fingers being of equal length, the tines being disposed in a manner to give the outer end of the rake a substantially curved form and means for relatively holding the outer ends of the tines in an arched position with the outer ends of the middle tines higher than the outer ends of the tines at the sides of the rake.

6. A rake comprising a plurality of tines, the free end of each tine carrying a downwardly extending finger, all of the fingers being of equal length, the tines being disposed in a manner to give the outer end of the rake a substantially curved form and a rake head supporting the tines in spaced relation with the outer ends of the tines disposed in an arched position with the outer ends of the middle tines higher than the outer ends of the tines at the sides of the rake.

7. A rake comprising a plurality of tines, each being in the form of a relatively thin narrow strip of spring steel or like material, the free end of each tine carrying a downwardly extending finger, all of the fingers being of equal length, the tines being disposed in a manner to give the outer end of the rake a substantially curved form and means for relatively holding the outer ends of the tines in an arched position with the outer ends of the middle tines higher than the outer ends of the tines at the sides of the rake.

8. A rake comprising a plurality of tines, the free end of each tine carrying a downwardly extending finger, all of the fingers being of equal length, the tines being disposed in a manner to give the outer end of the rake a curved shape and means for holding the outer ends of the tines in an arched position with the outer ends of the middle tines higher than the outer ends of the tines at the sides of the rake.

9. A broom rake comprising an elongated handle, a plurality of laterally spaced tines extending forwardly from the handle terminating in ground-engageable end portions, the forward portions of the tines being disposed to define an upwardly convex surface and the ground-engageable end portions defining a forwardly convex line to cause all of the ground-engageable portions to be parallel to the ground when the handle is held in an inclined position of use.

10. A broom rake comprising a handle, a cross head at the lower end thereof and supported thereby, said cross head being of transversely arched form, a plurality of resiliently flexible tine elements supported by said cross head in transversely arched relation, the free end of each tine terminating in a downwardly extending finger portion whereby the tine ends are disposed in a substantially horizontal plane when the handle is held in the normal operative position.

11. A broom rake comprising a handle, a cross head at the lower end thereof and supported thereby, said cross head being bowed rearwardly and downwardly from its intermediate portion, a plurality of resiliently flexible tine elements supported by said cross head and presenting forwardly extending free ends in spaced relation, the free tine ends being relatively disposed so as to substantially define an arch with the handle in a horizontal position whereby they will be disposed substantially in the same horizontal plane when the handle is held in the normal inclined operative position.

12. A broom rake comprising a handle, a cross head at the lower end thereof and supported thereby, said cross head being of horizontally forwardly convex and vertically upwardly convexed form, a plurality of resiliently flexible tine elements supported by said cross head, the free end of each tine engageable with the ground, the tines being so disposed that the outer ends thereof are upwardly convexly grouped in the plane of the handle whereby they are substantially in a horizontal plane when the handle is held in the normal inclined operative position.

13. A broom rake comprising an elongated handle, a cross head secured to the handle, a plurality of laterally spaced tines extending forwardly from the handle terminating forwardly in ground-engageable end portions, the cross head being upwardly convex to dispose the forward portions of the tines so as to define an upwardly convex surface and the ground-engageable end portions defining a forwardly convex line to cause all of the ground-engageable end portions to be parallel to the ground when the handle is held in an inclined position of use.

14. A rake of the broom type having forwardly extending tines in spaced fanwise relation defining generally a portion of the lateral surface of a cone.

15. A broom rake comprising an elongated handle, a cross head secured to the handle, a plurality of laterally spaced tines of equal length extending forwardly from the handle terminating forwardly in ground-engageable end portions, the cross head being upwardly convex and forwardly convex to cause the forward portions of the tines to define an upwardly convex surface and the ground-engageable end portions to define a forwardly convex line to thereby cause all of the ground-engageable end portions to be parallel to the ground when the handle is held in an inclined position of use.

CHARLES DENNIS.